No. 884,100. PATENTED APR. 7, 1908.
G. MEACHAM & J. G. SUNDBLOM.
POWER TRANSMISSION BELT.
APPLICATION FILED AUG. 24, 1907.

WITNESSES:
René Bruine
William F. Martinez

INVENTORS:
George Meacham,
and John Gustavus Sundblom,
By Attorneys,
Arthur E. Frasert Usina ial arrangement needed.

UNITED STATES PATENT OFFICE.

GEORGE MEACHAM AND JOHN GUSTAVUS SUNDBLOM, OF LONGREACH, QUEENSLAND, AUSTRALIA.

POWER-TRANSMISSION BELT.

No. 884,100.  Specification of Letters Patent.  Patented April 7, 1908.

Application filed August 24, 1907. Serial No. 389,961.

*To all whom it may concern:*

Be it known that we, GEORGE MEACHAM, a subject of the King of Great Britain and Ireland, &c., residing at Longreach, in the State of Queensland, Commonwealth of Australia, and JOHN GUSTAVUS SUNDBLOM, a subject of the King of Great Britain and Ireland, &c., residing at Longreach, in the State of Queensland, Commonwealth of Australia aforesaid, have invented certain new and useful Improvements in Power-Transmission Belts; and we do hereby declare the following to be a full, clear, and exact description of the invention, such as will enable others skilled in the art to which it appertains to make and use the same.

Our invention relates to power transmission belts, or bands, which are capable of being, at will, easily lengthened or shortened to a large or small extent.

Our belt provides strength and simplicity and allows of good gripping of pulleys. It is made of leather, fabric, or any other suitable continuous material or materials of suitable flexibility—in so far as a circuit (hereafter called the pulley circuit) is concerned which is to contact with pulleys or the like. But, in addition, there is externally a partial overlap or complete outer circuit composed partly of the said flexible material, and partly of drive chain, coupling links, or a series of detachable connections of any suitable kind. Series of hook ended rectangular links may for example be used, the bar of each link at the end opposite its hook being (as by sliding) engageable with, or disengageable from, the hook of an adjoining link, when the links are brought into particular relative positions.

In the accompanying drawings the invention is illustrated, but modifications may be made in sundry details without departing from this invention.

Figure 1:
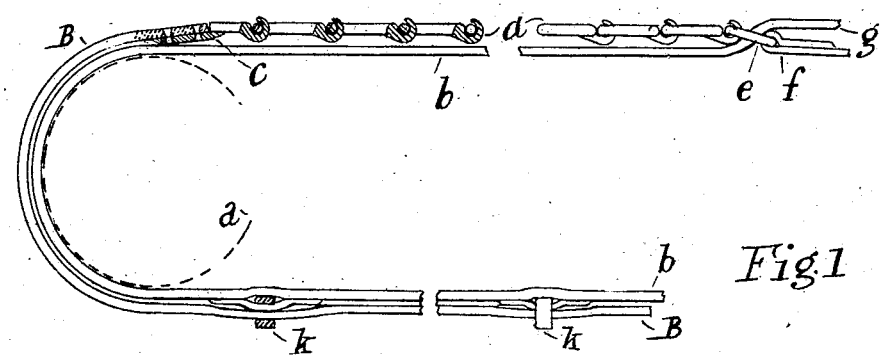
Figure 2:
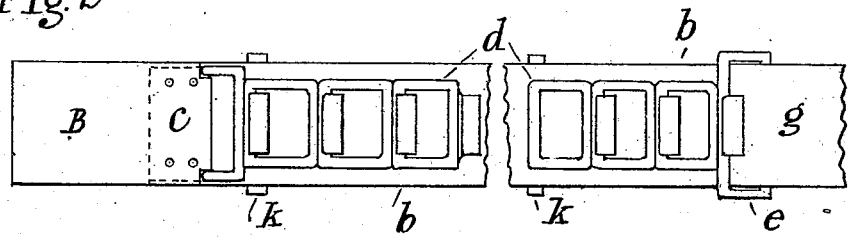
Figure 3:
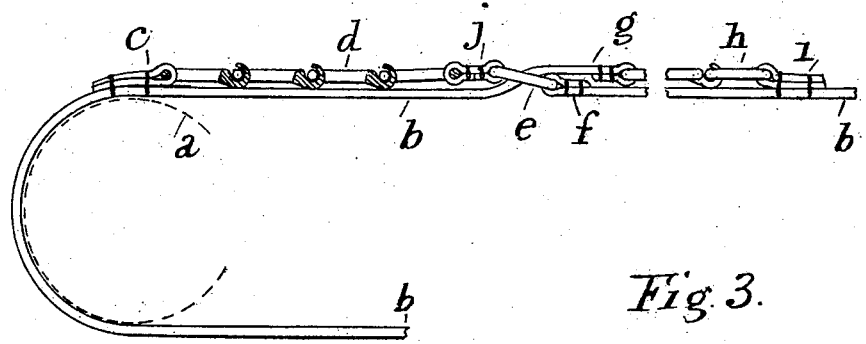

Figure 1 shows a side view (partly sectional) of a portion of a double circuit belt, a pulley being shown dotted; and Fig. 2 is a plan view of the same. Fig. 3 shows a side view (partly sectional) of a belt the pulley circuit of which is partly overlapped; and Fig. 4 is a plan of Fig. 3.

In the drawings let $a$ indicate a pulley or the like and $b$ a pulley circuit consisting of any suitable material, preferably leather or other continuous flexible belting.

In Figs. 1 and 2 of the drawings the pulley circuit $b$ has portions which cross each other, each of such portions lying over the face of the body of the belt adjacent to the other portion. In order to cross the belt a ring or link $e$ is fastened to one end of the belting at $f$, through which ring the opposite portion of the belting $b$ extends. The overlapping portion $g$ of the belting may be continued around the entire outer portion of the belting $b$ and finally connected by links $d$ with the ring $e$. The links $d$ are preferably so constructed that one or more may be added or taken out, thereby providing an adjustment of the total length of the belt. The links $d$ may be connected with the portion B of the overlapping belt by a rivet or other connection as shown at $c$. The overlapping portion may be connected with the pulley circuit $b$ at various points in its length as shown for instance at $k$. Any other means for crossing and fastening the belt may be employed.

Figure 4:
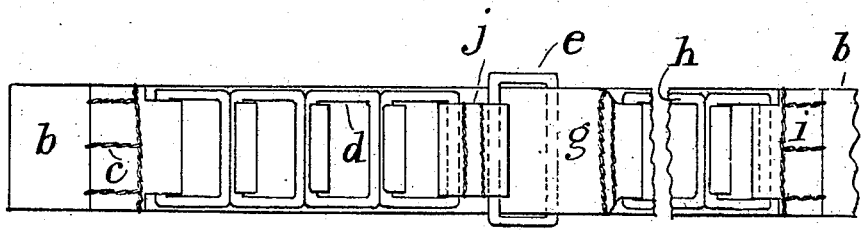

In Figs. 3 and 4, we have indicated the preferred construction in which the overlapping portions of the belt are not carried completely around the pulley circuit $b$ but are fastened along its upper side at points which are adjacent to the crossing, as shown. In this construction a series of removable links may be attached to each end of the belt, which may be connected to the body of the belting by loops or other attachments. At one end it will be found preferable to introduce a link such as $h$.

In both of the constructions set forth, it will be noted that the belt has a point of crossing and that the portions which cross each other lie over the outer face of the body of the belt adjacent to the point of crossing. Both constructions also have an important capability of adjustment without interfering with the pulley circuit $b$ or belt proper.

When it is required to shorten the belt any one of the links $d$ is removed, and when required the belting is easily lengthened by adding as many links as desirable.

By using belting as above described many advantages are securable. The links need not be of special or uniform width or length, as shown the metal links $d$ are narrower than the leather or other flexible material $b$ underneath. Various styles of the said outer adjustable part of the belting are however applicable, though the chain shown is the simplest. When not in use the belt can be uncoupled and packed in any convenient way.

What we do claim as our invention and desire to secure by Letters Patent of the United States is:—

1. A power transmission belt or band consisting of a length of flexible material, to form a circuit to pass round pulleys or the like, having in combination therewith on the outer side thereof, individually removable regulatable parts, portions of the said circuit being crossed to extend to the outer side as described.

2. A power transmission belt or band having a pulley circuit portion of material of sufficient flexibility, and two lengths of individually removable metal links, which at each end connect to the said circuit portion, the connections crossing one another as described.

3. A power transmission belt or band having a pulley circuit portion of material of sufficient flexibility, and two lengths of individually removable metal links of less width than said belts which at each end connect to the said circuit portion, the connections crossing one another as described.

4. A power transmission belt having two portions crossing each other, each portion lying over the face of the body of the belt adjacent to the other portion, and means for adjusting such portions whereby to alter the length of the belt.

5. A power transmission belt having two portions crossing each other, one portion having a part through which the other passes, and means for adjusting such portions to alter the length of the belt.

6. A power transmission belt or band consisting of a continuous length of leather fabric or other continuous flexible material or materials, to form a circuit to pass around pulleys or the like, portions of said circuit being crossed to lie along the outer side of the belt near the point of junction of the ends, but not completely encircling the belt.

In testimony whereof we affix our signatures in presence of two witnesses.

GEORGE MEACHAM.
JOHN GUSTAVUS SUNDBLOM.

Witnesses:
   JAMES SUMMERS SPEIRS,
   CHRISTOPHER ROBERT CLARKE.